United States Patent
Ng et al.

(10) Patent No.: US 11,292,745 B2
(45) Date of Patent: Apr. 5, 2022

(54) MODIFIED POLYESTER FIBER FOR CEMENTITIOUS COMPOSITE AND METHOD FOR SURFACE TREATMENT OF THE SAME

(71) Applicant: Hip Hing Construction Technology Limited, Kowloon (HK)

(72) Inventors: Kai-Mo Ng, Shatin (HK); Honggang Zhu, Shatin (HK); Christopher Kin Ying Leung, Kowloon (HK); Pengyu Chen, Shatin (HK); Kwok Leung So, Shatin (HK)

(73) Assignee: Hip Hing Construction Technology Limited, Kowloon (HK)

( * ) Notice: Subject to any disclaimer, the term of this patent is extended or adjusted under 35 U.S.C. 154(b) by 13 days.

(21) Appl. No.: 16/870,509

(22) Filed: May 8, 2020

(65) Prior Publication Data

US 2021/0171396 A1   Jun. 10, 2021

Related U.S. Application Data

(60) Provisional application No. 62/945,277, filed on Dec. 9, 2019.

(51) Int. Cl.

| | |
|---|---|
| C08L 67/02 | (2006.01) |
| C04B 20/00 | (2006.01) |
| C08G 63/91 | (2006.01) |
| C08J 3/24 | (2006.01) |
| C08J 7/04 | (2020.01) |
| C04B 20/12 | (2006.01) |
| D06M 15/333 | (2006.01) |
| D06M 11/01 | (2006.01) |
| D06M 101/32 | (2006.01) |

(52) U.S. Cl.
CPC ........ *C04B 20/0068* (2013.01); *C04B 20/123* (2013.01); *C08G 63/916* (2013.01); *C08J 3/245* (2013.01); *C08J 7/042* (2013.01); *D06M 11/01* (2013.01); *D06M 15/333* (2013.01); *C08J 2367/02* (2013.01); *C08J 2429/04* (2013.01); *C08J 2471/02* (2013.01); *D06M 2101/32* (2013.01)

(58) Field of Classification Search
CPC .............. C04B 20/0068; C04B 20/123; C04B 16/0683; C04B 20/1033; C04B 20/023; C08G 63/916; C08J 3/245; C08J 7/042; C08J 2367/02; C08J 2429/04; C08J 2471/02; D06M 15/333; D06M 2101/32; D06M 13/192; D06M 13/207; D06M 11/38; D06M 11/45; D06M 15/53; C08L 67/02
USPC ......................................................... 523/201
See application file for complete search history.

(56) References Cited

U.S. PATENT DOCUMENTS 9,738,563 B1 *   8/2017   Bao .................. C04B 41/009
2018/0209074 A1 *   7/2018   Imakita .................. D01F 6/84

* cited by examiner

*Primary Examiner* — Hannah J Pak
(74) *Attorney, Agent, or Firm* — Hogan Lovells US LLP (57) ABSTRACT

The disclosure relates to a method for the surface treatment of a polyester fiber, a modified polyester fiber obtained therefrom, and an engineered cementitious composite containing such modified polyester fibers. The method comprises subjecting the polyester fiber to an alkali hydrolysis to obtain hydrolyzed polyester fiber; applying a solution containing an acid cross-linker and a polyvinyl alcohol to the hydrolyzed polyester fiber, then curing to form a coating having a thickness of sub-micron or micron scale on the polyester fiber, thereby obtaining the modified polyester fiber.

18 Claims, 4 Drawing Sheets

MODIFIED POLYESTER FIBER FOR CEMENTITIOUS COMPOSITE AND METHOD FOR SURFACE TREATMENT OF THE SAME

CROSS-REFERENCE TO RELATED APPLICATION

This application incorporates by reference, and, for all intents and purposes, claims the benefit of U.S. Provisional patent Application No. 62/945,277, filed Dec. 9, 2019.

BACKGROUND

Polyester fiber is one of the most important and economically produced synthetic fibers with a wide range of applications in the textile industry. Recently, polymer synthetic fibers, such as polyvinyl alcohol (PVA), polyamide (PA), polyethylene (PE), polypropylene (PP), are increasingly applied in many construction material related applications, for example, building, decoration or the like, and one example is fiber reinforced concrete and engineered cementitious composites (ECC). Engineered cementitious composite (ECC) is a type of high-performance fiber-reinforced concrete that contains a small amount (i.e. <2.5 vol %) of short fibers uniformly distributed within the concrete matrix, exhibiting high ductility and excellence in crack width control due to the distributed matrix cracks being bridged by fibers.

The success of the ECC is in employing short polymer fibers with a hydrophilic surface characteristic that can bond well with the concrete matrix in which a strong interfacial action between the fiber surface and concrete matrix can be established. Generally, synthetic PVA fiber is commonly used for ECC application, but the cost of these fibers is very high (at least 4-5 times of polyester fiber). Other common fibers such as PP and PE fibers, are hydrophobic, and would not form a good interface with the hydrophilic-like concrete matrix. More importantly, the surface treatments for PE and PP fibers are very difficult and costly, sometimes involving strong acid or alkali condition or expensive gas-phase plasma or corona treatment methods.

The polyester fiber surface is also hydrophobic, which hinders the application of this material in ECC. In the literature, there are a number of surface treatment approaches that have been developed to produce polyester fiber with a hydrophilic characteristic. Normally, the surface treatments involve a mild acid or mild alkali hydrolysis of the polyester fiber and then chemical grafting of some hydrophilic polymers such as polyethylene glycol or polyethylene oxide.

However, the chemical surface modification method of polyester fibers is largely used for industrial textile processing (e.g. dyeing). In textile processing, the hydrophilic coating is prepared by a simple polymeric grafting procedure, therefore the resulting coating is relatively thin and not mechanically strong enough to resist high shear mixing processes of fiber reinforced concrete materials.

Therefore, there is a need for a novel surface treatment that can produce a robust coating with a hydrophilic property which can firmly attach to polyester fibers and which is mechanically strong enough to resist the rigorous concrete mixing process.

SUMMARY

In one aspect of the disclosure, provided is a method for preparing a modified polyester fiber, comprising subjecting a polyester fiber to an alkali hydrolysis to obtain a hydrolyzed polyester fiber; applying a solution containing an acid cross-linker and a polyvinyl alcohol to the hydrolyzed polyester fiber, and then curing to form a coating having a thickness of sub-micron or micron scale on the polyester fiber, thereby obtaining the modified polyester fiber, wherein a weight ratio of the polyvinyl alcohol to the hydrolyzed polyester fiber is 1:3-20.

In one embodiment, the solution containing an acid cross-linker and a polyvinyl alcohol further contains a nanoparticle. In another embodiment, the nanoparticle is a $SiO_2$ nanoparticle, $Al_2O_3$ nanoparticle, or $CaCO_3$ nanoparticle. In another embodiment, the weight ratio of the nanoparticle to the polyvinyl alcohol is 1:1-10.

In one embodiment, the polyester fiber is subjected to a hydrolysis in a 3-10 wt % alkali metal hydroxide aqueous solution at a weight ratio of 1:5-30 for 20-40 min at a temperature of 75-90° C., after which the fiber is washed with water to become neutral, thereby obtaining the hydrolyzed polyester fiber. In another embodiment, the polyester fiber is subjected to a hydrolysis in a 5 wt % sodium hydroxide aqueous solution at a weight ratio of 1:25-28 for 30 min at a temperature of 80-85° C., after which the fiber is washed with water to become neutral, thereby obtaining the hydrolyzed polyester fiber.

In one embodiment, the acid cross-linker is a di-carboxylic acid cross-linker, a tri-carboxylic acid cross-linker, or a tetra-carboxylic acid cross-linker. In another embodiment, the weight ratio of the polyvinyl alcohol to the acid cross-linker is 10-30:1. In another embodiment, the hydrolyzed polyester fiber is mixed and stirred in the solution containing the acid cross-linker and the polyvinyl alcohol at 25-60° C. for 10-15 min. In one embodiment, the acid cross-linker is citric acid, and the weight ratio of the polyvinyl alcohol to the citric acid is 20:1. In another embodiment, the hydrolyzed polyester fiber is mixed and stirred in the solution containing the citric acid and the polyvinyl alcohol at 50° C. for 10-15 min.

In one embodiment, the curing is conducted for 20-40 min at a temperature of 120-140° C. In another embodiment, the curing is conducted for 30 min at a temperature of 135° C. In one embodiment, the polyester fiber is a short fiber or a long fiber having a diameter of 10-50 μm. In another embodiment, the polyester fiber is a fiber having a diameter of 20-40 μm and a length of 6-15 mm.

In one embodiment, the coating has a thickness of 100-500 nm. In another embodiment, the nanoparticle has an average particle size of 20-40 nm, such as 30 nm. In such embodiment, the coating has a thickness of 700 nm-3.4 μm. In another embodiment, the coating is further coated with one or more layers of polyethylene glycol.

In another aspect of the disclosure, provided is a method for preparing a cementitious composite, comprising subjecting a polyester fiber to an alkali hydrolysis to obtain a hydrolyzed polyester fiber; applying a solution containing an acid cross-linker and a polyvinyl alcohol to the hydrolyzed polyester fiber, and then curing to form a coating having a thickness of sub-micron or micron scale on the polyester fiber, thereby obtaining the modified polyester fiber, wherein the weight ratio of the polyvinyl alcohol to the hydrolyzed polyester fiber is 1:3-20; mixing the modified polyester fiber with a concrete material containing water and one or more selected from cement, sand, mineral filler and additive, and then curing the mixture, thereby obtaining the cementitious composite. In such embodiment, the volume ratio of the modified polyester fiber to the cementitious composite is 2.5% or less, such as 1.5-2.5%.

In one embodiment, the solution containing an acid cross-linker and polyvinyl alcohol further contains a nanoparticle. In another embodiment, the nanoparticle is a $SiO_2$ nanoparticle, $Al_2O_3$ nanoparticle, or $CaCO_3$ nanoparticle. In another embodiment, the weight ratio of the nanoparticle to the polyvinyl alcohol is 1:1-10.

In one embodiment, the polyester fiber is subjected to a hydrolysis in a 3-10 wt % alkali metal hydroxide aqueous solution at a weight ratio of 1:5-30 for 20-40 min at a temperature of 75-90° C., after which the fiber is washed with water to become neutral, thereby obtaining the hydrolyzed polyester fiber. In another embodiment, the polyester fiber is subjected to a hydrolysis in a 5 wt % sodium hydroxide aqueous solution at a weight ratio of 1:25-28 for 30 min at a temperature of 80-85° C., after which the fiber is washed with water to become neutral, thereby obtaining the hydrolyzed polyester fiber.

In one embodiment, the acid cross-linker is a di-carboxylic acid cross-linker, a tri-carboxylic acid cross-linker, or a tetra-carboxylic acid cross-linker. In another embodiment, the weight ratio of the polyvinyl alcohol to the acid cross-linker is 10-30:1. In another embodiment, the hydrolyzed polyester fiber is mixed and stirred in the solution containing the acid cross-linker and the polyvinyl alcohol at 25-60° C. for 10-15 min. In one embodiment, the acid cross-linker is citric acid, and the weight ratio of the polyvinyl alcohol to the citric acid is 20:1. In another embodiment, the hydrolyzed polyester fiber is mixed and stirred in the solution containing the citric acid and the polyvinyl alcohol at 50° C. for 10-15 min.

In one embodiment, the curing is conducted for 20-40 min at a temperature of 120-140° C. In another embodiment, the curing is conducted for 30 min at a temperature of 135° C. In one embodiment, the polyester fiber is a short fiber or a long fiber having a diameter of 10-50 µm. In another embodiment, the polyester fiber is a fiber having a diameter of 20-40 µm and a length of 6-15 mm.

In one embodiment, the coating has a thickness of 100-500 nm. In another embodiment, the nanoparticle has an average particle size of 20-40 nm, such as 30 nm. In such embodiment, the coating has a thickness of 700 nm-3.4 µm. In another embodiment, the coating is further coated with one or more layers of polyethylene glycol.

In another aspect of the disclosure, provided is a modified polyester fiber prepared by a method comprising subjecting a polyester fiber to an alkali hydrolysis to obtain a hydrolyzed polyester fiber; applying a solution containing an acid cross-linker and a polyvinyl alcohol to the hydrolyzed polyester fiber, and then curing to form a coating having a thickness of sub-micron or micron scale on the polyester fiber, thereby obtaining the modified polyester fiber, wherein the weight ratio of the polyvinyl alcohol to the hydrolyzed polyester fiber is 1:3-20.

In one embodiment, the solution containing an acid cross-linker and a polyvinyl alcohol further contains a nanoparticle. In another embodiment, the nanoparticle is a $SiO_2$ nanoparticle, $Al_2O_3$ nanoparticle, or $CaCO_3$ nanoparticle. In another embodiment, the weight ratio of the nanoparticle to the polyvinyl alcohol is 1:1-10.

In one embodiment, the polyester fiber is subjected to a hydrolysis in a 3-10 wt % alkali metal hydroxide aqueous solution at a weight ratio of 1:5-30 for 20-40 min at a temperature of 75-90° C., after which the fiber is washed with water to become neutral, thereby obtaining the hydrolyzed polyester fiber. In another embodiment, the polyester fiber is subjected to a hydrolysis in a 5 wt % sodium hydroxide aqueous solution at a weight ratio of 1:25-28 for 30 min at a temperature of 80-85° C., after which the fiber is washed with water to become neutral, thereby obtaining the hydrolyzed polyester fiber.

In one embodiment, the acid cross-linker is a di-carboxylic acid cross-linker, a tri-carboxylic acid cross-linker, or a tetra-carboxylic acid cross-linker. In another embodiment, the weight ratio of the polyvinyl alcohol to the acid cross-linker is 10-30:1. In another embodiment, the hydrolyzed polyester fiber is mixed and stirred in the solution containing the acid cross-linker and the polyvinyl alcohol at 25-60° C. for 10-15 min. In one embodiment, the acid cross-linker is citric acid, and the weight ratio of the polyvinyl alcohol to the citric acid is 20:1. In another embodiment, the hydrolyzed polyester fiber is mixed and stirred in the solution containing the citric acid and the polyvinyl alcohol at 50° C. for 10-15 min.

In one embodiment, the curing is conducted for 20-40 min at a temperature of 120-140° C. In another embodiment, the curing is conducted for 30 min at a temperature of 135° C. In one embodiment, the polyester fiber is a short fiber or a long fiber having a diameter of 10-50 µm. In another embodiment, the polyester fiber is a fiber having a diameter of 20-40 µm and a length of 6-15 mm.

In one embodiment, the coating has a thickness of 100-500 nm. In another embodiment, the nanoparticle has an average particle size of 20-40 nm, such as 30 nm. In such embodiment, the coating has a thickness of 700 nm-3.4 µm. In another embodiment, the coating is further coated with one or more layers of polyethylene glycol.

In another aspect of the disclosure, provided is a cementitious composite prepared by a method comprising subjecting a polyester fiber to an alkali hydrolysis to obtain a hydrolyzed polyester fiber; applying a solution containing an acid cross-linker and a polyvinyl alcohol to the hydrolyzed polyester fiber, and then curing to form a coating having a thickness of sub-micron or micron scale on the polyester fiber, thereby obtaining the modified polyester fiber, wherein the weight ratio of the polyvinyl alcohol to the hydrolyzed polyester fiber is 1:3-20; mixing the modified polyester fiber with a concrete material containing water and one or more selected from cement, sand, mineral filler and additive, and then curing the mixture, thereby obtaining the cementitious composite. In such embodiment, the volume ratio of the modified polyester fiber to the cementitious composite is 2.5% or less, such as 1.5-2.5%.

In one embodiment, the solution containing an acid cross-linker and polyvinyl alcohol further contains a nanoparticle. In another embodiment, the nanoparticle is a $SiO_2$ nanoparticle, $Al_2O_3$ nanoparticle, or $CaCO_3$ nanoparticle. In another embodiment, the weight ratio of the nanoparticle to the polyvinyl alcohol is 1:1-10.

In one embodiment, the polyester fiber is subjected to a hydrolysis in a 3-10 wt % alkali metal hydroxide aqueous solution at a weight ratio of 1:5-30 for 20-40 min at a temperature of 75-90° C., after which the fiber is washed with water to become neutral, thereby obtaining the hydrolyzed polyester fiber. In another embodiment, the polyester fiber is subjected to a hydrolysis in a 5 wt % sodium hydroxide aqueous solution at a weight ratio of 1:25-28 for 30 min at a temperature of 80-85° C., after which the fiber is washed with water to become neutral, thereby obtaining the hydrolyzed polyester fiber.

In one embodiment, the acid cross-linker is a di-carboxylic acid cross-linker, a tri-carboxylic acid cross-linker, or a tetra-carboxylic acid cross-linker. In another embodiment, the weight ratio of the polyvinyl alcohol to the acid cross-linker is 10-30:1. In another embodiment, the hydrolyzed polyester fiber is mixed and stirred in the solution containing the acid cross-linker and the polyvinyl alcohol at 25-60° C. for 10~15 min. In one embodiment, the acid cross-linker is citric acid, and the weight ratio of the polyvinyl alcohol to the citric acid is 20:1. In another embodiment, the hydrolyzed polyester fiber is mixed and stirred in the solution containing the citric acid and the polyvinyl alcohol at 50° C. for 10-15 min.

In one embodiment, the curing is conducted for 20-40 min at a temperature of 120-140° C. In another embodiment, the curing is conducted for 30 min at a temperature of 135° C. In one embodiment, the polyester fiber is a short fiber or a long fiber having a diameter of 10-50 µm. In another embodiment, the polyester fiber is a fiber having a diameter of 20-40 µm and a length of 6-15 mm.

In one embodiment, the coating has a thickness of 100-500 nm. In another embodiment, the nanoparticle has an average particle size of 20-40 nm, such as 30 nm. In such embodiment, the coating has a thickness of 700 nm-3.4 µm. In another embodiment, the coating is further coated with one or more layers of polyethylene glycol.

In accordance with the disclosure, a cross-linked polymeric coating is produced by coating a hydrolyzed polyester fiber with a PVA solution containing a small amount of cross-linker, and the cross-linking process can be readily implemented by a heating curing process. Therefore, a stable and robust cross-linked PVA polymer coating can be formed on the polyester fiber. The PVA coating so obtained can firmly adhere to the polyester fiber and resist the rigorous mixing process of the concrete. In addition, the inventors find that such PVA coating can significantly enhance the interfacial bonding between the fiber and cement matrix, and when the polymeric coating contains nanoparticles such as $SiO_2$, the interfacial bonding between the fiber and cement matrix is further enhanced.

DESCRIPTION OF DRAWINGS

The embodiments of the disclosure are further illustrated by reference to the figures, but these figures are only used for a person having ordinary skill in the art to better understand the disclosure without limiting the scope thereof.

DETAILED DESCRIPTION

Hereinafter, the disclosure is further illustrated by reference to the specific embodiments. However, these specific embodiments are only illustrative, and not intended to limit the scope of the disclosure. The skilled person could appreciate that any specific feature of one embodiment can be used in another embodiment without departing from the inventive concept of the disclosure.

In one embodiment, the method for preparing a modified polyester fiber comprises subjecting a polyester fiber to an alkali hydrolysis to obtain a hydrolyzed polyester fiber; applying a solution containing an acid cross-linker and a polyvinyl alcohol to the hydrolyzed polyester fiber, and then curing the fiber to form a polyvinyl alcohol coating on the polyester fiber, thereby obtaining the modified polyester fiber. By the method of the disclosure, a cross-linked coating (such as PVA coating) having a thickness of sub-micron or micron scale can be formed on the polyester fiber (for example, short fiber or long fiber, such as chopped or rolled yarn), and the formed coating is relatively thick to resist high shear process which may occur in the subsequent application (such as use in ECC).

In one embodiment, the polyester fiber may be subjected to hydrolysis in an aqueous solution having 3-10 wt % of alkali metal hydroxide, such as an aqueous solution having 4 wt %, 5 wt %, 6 wt %, 7 wt %, 8 wt % or 9 wt % of alkali metal hydroxide. In another embodiment, the hydrolysis may be conducted under a heating condition in which the temperature is higher than room temperature, for example, at a temperature of 75-90° C., such as 80° C.-85° C. In yet another embodiment, the hydrolysis may be conducted for 20-40 min, such as 25, 30, 35 min, or any other time within that range. In a further embodiment, the weight ratio of the polyester fiber to the alkali metal hydroxide aqueous solution is 1:5-30, for example, 1:20-30, such as 1:22, 1:23, 1:24, 1:25, 1:26, 1:27, or 1:28.

Figure 2:
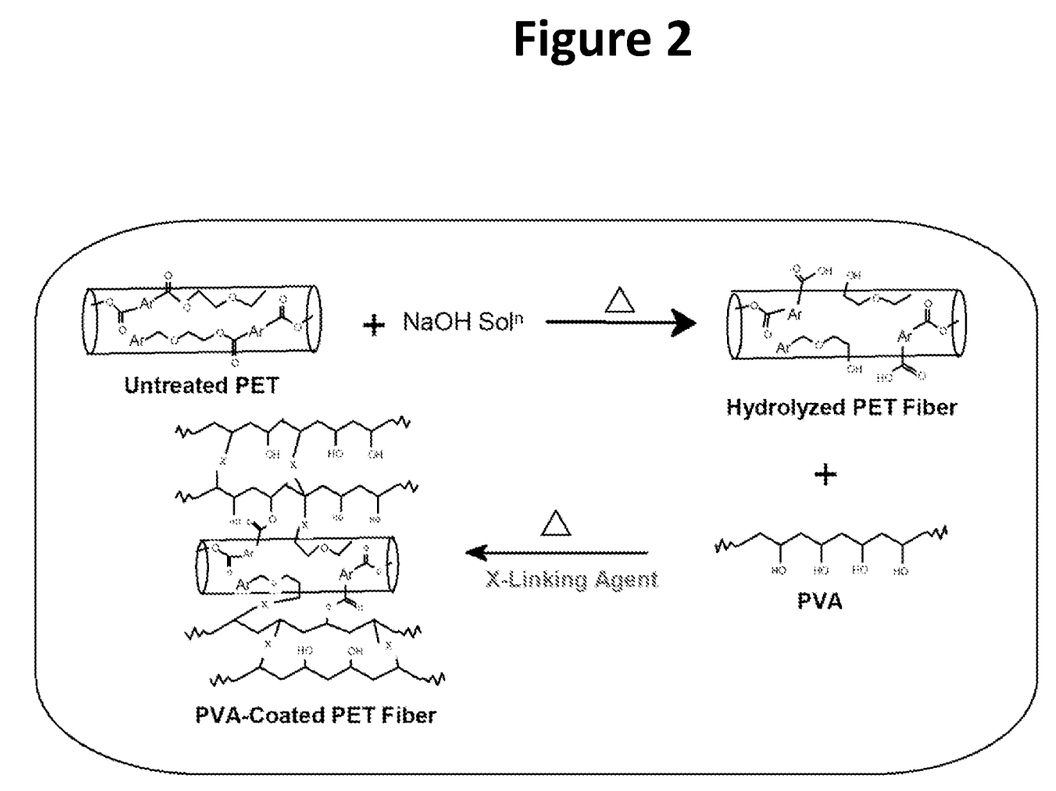
FIG. 2 is a schematic drawing of the method for preparing PVA modified polyester fiber according to an embodiment of the disclosure.

In one embodiment, the polyester may be subjected to hydrolysis in an aqueous solution containing 5 wt % of sodium hydroxide for 30 min at a temperature of 80-85° C. In that embodiment, any other dilute alkali solution can be used in the hydrolysis of the surface of the PET fiber to convert the low polar ester functional group ($RCO_2R'$) into high polar reactive carboxylic group ($RCO_2H$) and hydroxyl group (R'—OH), as shown in FIG. 2. In one embodiment, the polyester fiber that has been subjected to the hydrolysis treatment is washed with water to be neutral for the subsequent reaction.

The polyvinyl alcohol is reacted with the surface of the polyester fiber in the presence of di-carboxylic acid, tri-carboxylic acid or tetra-carboxylic acid cross-linker (preferably di-carboxylic acid or tri-carboxylic acid), thereby forming an ester group between the hydroxyl group on the polyester fiber surface and the side chain of the polyvinyl alcohol. The cross-linking reaction could further introduce additional polyvinyl alcohol in order to improve the surface polarity of the PVA coated polyester fiber.

In one embodiment, in the modified polyester fiber, the weight ratio of the polyvinyl alcohol to the polyester fiber may be 1:3-20, for example 1:3-10 or 1:3-5, such as 1:3, 1:4, 1:5, 1:6, 1:7, 1:8, 1:9, 1:10, 1:12, 1:15, 1:18, or 1:20. In another embodiment, the weight ratio of the polyvinyl alcohol to the acid cross-linker may be 10-30:1, for example, 15-25:1. In a further embodiment, the acid cross-linker may be citric acid, and the weight ratio of the polyvinyl alcohol to the citric acid is 20:1. In yet another embodiment, the hydrolyzed polyester fiber can be mixed in an aqueous solution containing the acid cross-linker and the polyvinyl alcohol for 10-15 min at a temperature of 25-60° C., for example 40-60° C. (such as about 50° C.). In one embodiment, the curing is conducted for 20-40 min at a temperature of 120-140° C., for example, for 30 min at a temperature of 135° C.

In order to further improve the surface robust and interfacial interaction of the polyester fiber, a small amount of nanoparticles (for example, <2 wt %) can be added into the polyvinyl alcohol solution. The nanoparticles may be nano-sized $SiO_2$, $Al_2O_3$, $CaCO_3$, or other nanoparticles commonly used in the art. 2 wt % or less of nanoparticles will not affect the coating process of the PVA solution, and thus a nano-composite coated polyester fiber can be obtained by the method of the disclosure. For example, the weight of the nanoparticles to the polyvinyl alcohol may be 1:0.5-10, for example, 1:1-10, such as 1:1, 1:2, 1:3, 1:4, 1:5, 1:6, 1:7, 1:8, 1:9, or 1:10. In one embodiment, the nanoparticle has an average particle size of 20-40 nm, such as 25 nm, 30 nm, or 35 nm. By adding nanoparticles into the PVA solution, a PVA-nanoparticles composite coating will be formed on the surface of the polyester fiber to further enhance the interfacial bonding between the fiber and the cement matrix.

By the method of the disclosure, a cross-linked PVA coating can be easily formed on the surface of the polyester fiber. The method of the disclosure involves a mild and simple process, the obtained PVA coating having good adhesion to resist high shear that occurs in the preparation of the cementitious composite. In one embodiment, the polyester fiber is a short fiber or a long fiber having a diameter of 10-50 µm, for example, 15 µm, 20 µm, 25 µm, 30 µm, 35 µm, 40 µm, or 45 µm. The fiber has a length of 6-15 mm, for example, 6 mm, 8 mm, 10 mm, 12 mm, 13 mm, or 14 mm. In one embodiment, the PVA coating may have a thickness of 100 nm-3.4 µm. For example, when the coating is formed of PVA, the coating obtained according to the method of the disclosure may have a thickness of 100-500 nm, for example, 150 nm, 200 nm, 250 nm, 300 nm, 350 nm, 400 nm, or 450 nm. When the coating contains the above nanoparticles, the coating may have a thickness of 700 nm-3.4 µm, for example, 900 nm, 1 µm, 1.2 µm, 1.5 µm, 1.8 µm, 2 µm, 2.5 µm, or 3 µm.

Figure 1A:
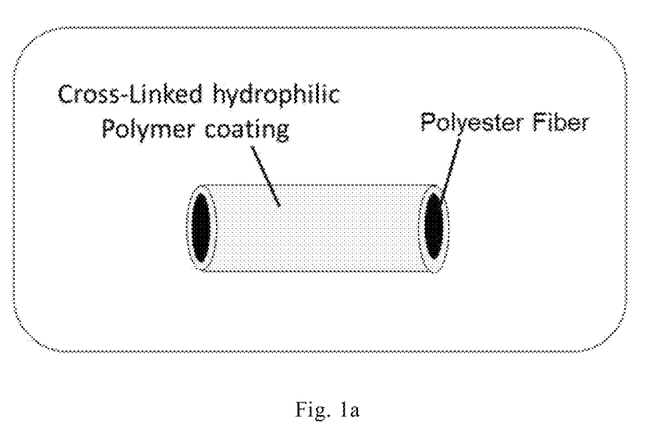
FIG. 1a is a schematic drawing of the modified polyester fiber according to an embodiment of the disclosure.
Figure 1B:
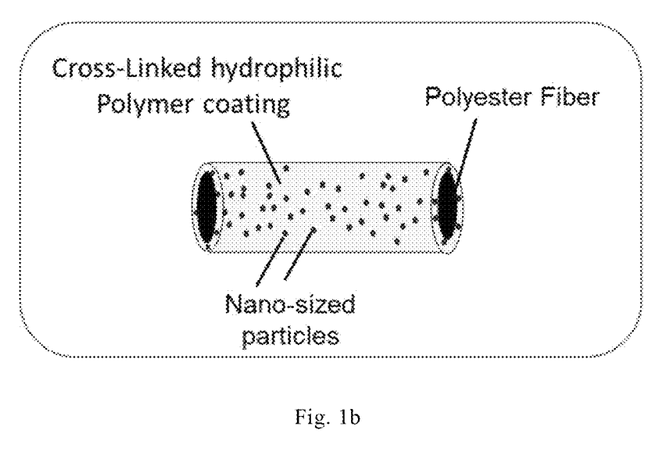
FIG. 1b is a schematic drawing of the modified polyester fiber according to another embodiment of the disclosure.

As shown in FIG. 1a and FIG. 2, one or more layers of cross-linked hydrophilic polymeric coatings can be adhered to the surface of the polyester fiber to form a robust coating structure. As shown in FIG. 1b, nanoparticles are uniformly distributed within the cross-linked network structure, and thus even if the fibers are subjected to high shear stirring, the polymeric coating and the nanoparticles will not be stripped from the fiber surface. In addition, since PVA coating could be firmly adhered to the surface of the PET fibers, this coating will be readily coated with other hydrophilic polymeric coating such as polyethylene glycol coating.

Therefore, the modified polyester fibers obtained according to the method of the disclosure can be easily mixed and cured with the concrete material to obtain a cementitious composite. In that case, the modified polyester fibers (for example, chopped fibers) can be uniformly mixed in a concrete material including cement, sand, mineral filler, additive, water or the like, and then cured to obtain a cementitious composite. In the cementitious composite, the volume ratio of the modified polyester fiber to the component may be 2.5% or less, for example, 1.5-2.5%, such as 1.5-2.0%. Since the composite containing a stable and robust thermosetting coating on the surface of the polyester fibers, the fibers have good affinity with the cement matrix and the coating can resist the mechanical force that occurs during the mechanical stirring process (which is a necessary step for the manufacture of concrete). The modified polyester fibers reinforced cementitious composite of the disclosure will have better ductility and crack width control as compared with other fibers reinforced cementitious composite.

The following examples are provided to understand the embodiments of the disclosure without any limitation. All the experimental procedures used in the following examples are conventional in the art unless otherwise specifically indicated. All the materials, reagents and the like used in the following examples are commercially available unless otherwise specifically indicated.

Polyester fibers were commercially available, and had diameters of 20 µm and 40 µm and a length of 12 mm Polyvinyl alcohol resin powders (PVA-588,-1788,-2688, 200 Mesh, >99%) were purchased from a Chinese company. Nano-silica LF-33 (average particle size of 30 nm) was supplied by XiuShan LonFee New Material Company Limited.

Example 1

5 wt % NaOH solution (4000 ml) was added into a reaction vessel (a 5000 ml beaker) equipped with a stirring unit and a heating unit at a temperature of 80-85° C., after which chopped PET fibers (diameter of 40 µm, length of 12 mm, 150 g) were added into the solution and mixed for 30 min at a temperature of 80-85° C. The fibers were collected and washed with deionized water to be neutral (pH of about 7), then dried in an oven to give about 145 g of hydrolyzed polyester PET fibers (yield of >95%).

The hydrolyzed PET fibers (145 g) were mixed into a solution (3000 ml) containing 1.0 wt % PVA-2688 polymer and 0.05 wt % of citric acid at a temperature of about 50° C., and stirred for 10~15 min at that temperature. The fibers were collected by filtration and cured for 30 min at a temperature of 135° C. in an oven. After cooling, a cross-linked PVA polymer network structure was formed on the surface of the PET fibers, thereby obtaining PVA modified PET fibers (140 g).

Example 2

5 wt % NaOH solution (4000 ml) was added into a reaction vessel (a 5000 ml beaker) equipped with a stirring unit and a heating unit at a temperature of 80-85° C., after which chopped polyester fibers (diameter of 40 µm, length of 12 mm, 150 g) were added into the solution and mixed for 30 min at a temperature of 80~85° C. The fibers were collected and washed with deionized water to be neutral (pH of about 7), then dried in an oven to give about 145 g of hydrolyzed polyester PET fibers (yield of >95%).

The hydrolyzed PET fibers (130 g) were mixed into a solution (3000 ml) containing 1.0 wt % PVA-2688 polymer, 0.05 wt % of citric acid and 1.0 wt % nano $SiO_2$ particles at a temperature of about 50° C., and stirred for 10-15 min at that temperature. The fibers were collected by filtration and cured for 30 min at a temperature of 135° C. in an oven. After cooling, a cross-linked PVA polymer network structure was formed on the surface of the PET fibers, thereby obtaining PVA/$SiO_2$ modified PET fibers (120 g).

Test Example 1: FTIR-ATR and SEM Analysis

Chemical functional groups at the surface of both treated and untreated PET fibers were characterized using the Fourier Transform Infrared Spectroscopy-Attenuated Total Reflection (FTIR-ATR) analysis and Scanning Electron Microscopy (SEM). The effect of the surface treatment on the PET fiber surface was evaluated by analyzing the chemical functional groups at the surface of untreated PET fibers, PVA coated PET fibers (obtained from example 1) and PVA/nano-silica coated PET fibers (obtained from example 2).

Figure 3:
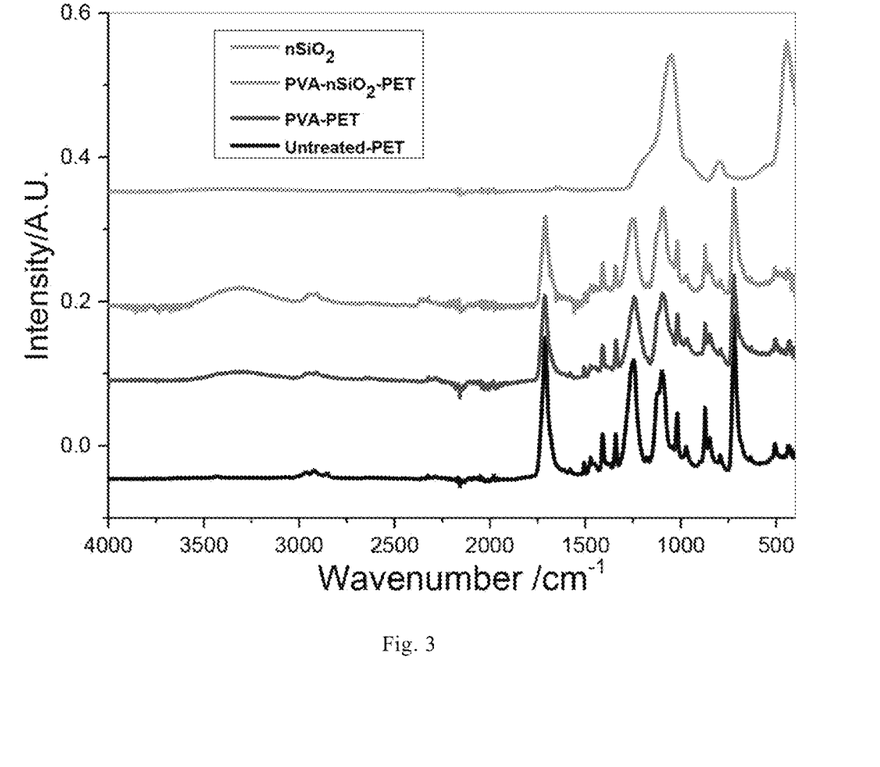
FIG. 3 shows Fourier Transform Infrared Spectroscopy-Attenuated Total Reflection (FTIR-ATR) spectrograms of untreated PET fiber, PVA coated PET fiber, and PVA/nano-silica coated PET fiber.

As shown in FIG. 3, the spectrum of the untreated PET fiber shows peak intensities at 2920 cm$^{-1}$ and 1300 cm$^{-1}$ due to aromatic and aliphatic C—H bond vibration, and at about 1100 cm$^{-1}$ and 1450 cm$^{-1}$ due to the C—O group as well as at ~1700 cm$^{-1}$ due to the carbonyl (C=O) group.

Upon grafting PVA polymer onto the surface of hydrolyzed PET fibers, the spectrum of PVA-coated PET fibers shows a strong and board absorption band between 3050 cm$^{-1}$ and 3550 cm$^{-1}$ due to the OH groups, suggesting that PVA polymer has been successfully bonded onto PET fiber surface. The FTIR spectrum of PVA-nSiO$_2$ coated PET fiber shows two characteristic Si—O functional group peaks at 1050 cm$^{-1}$ and 440 cm$^{-1}$, indicating the presence of SiO$_2$ nanoparticles at the PET fiber surface.

Figure 4:
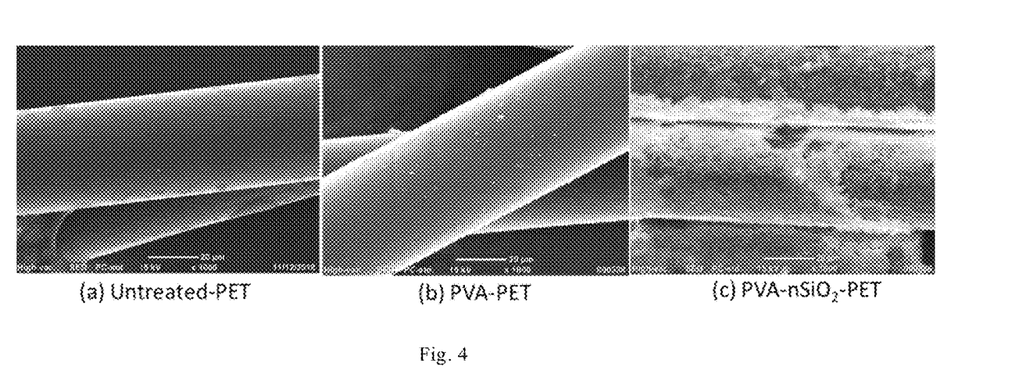
FIG. 4 shows SEM spectrograms of untreated PET fiber, PVA coated PET fiber, and PVA/nano-silica coated PET fiber.

As shown in FIG. 4, panels (a)-(c) show the SEM images of the untreated PET fibers, PVA coated PET fibers (obtained from example 1) and PVA/nano-silica coated PET fibers (obtained from example 2). FIG. 4 shows the surface morphology of the fibers before and after the surface treatment of the disclosure. The SEM image of PVA-coated PET fibers shows a relatively smooth fiber surface as shown in FIG. 4(b), suggesting the PVA-polymer coating has been successfully applied onto the PET fiber surface. The SEM image of PVA/nano-silica coated PET fibers shows that the nanoparticles (SiO$_2$) have been distributed in the polymeric coating on the PET fiber surface as shown in FIG. 4(c).

In accordance with the SEM images, the thickness of the coating can be estimated by measuring the PET fiber's diameter before and after the modification treatment. The diameter of the untreated PET fiber is about 40 µm, and the diameter of the PVA/nano-silica coated PET fiber is about 41.4-46.8 µm, i.e., the coating thickness is about from 700 nm to 3.4 µm. Similarly, the thickness of the PVA coating is 100 nm or more (but less than 500 nm).

Test Example 2: Single Fiber Pull-Out Analysis

The single fiber pull-out test was performed on untreated PET fibers, PVA coated PET fibers (obtained from example 1) and PVA/nano-silica coated PET fibers (obtained from example 2) to determine the fiber/matrix interfacial properties. In this test, the frictional bond (τ0), which shows the fiber/matrix interfacial property, was evaluated using the following equation (1):

$$\tau 0 \text{ (Frictional Bond)} = \frac{P_b}{\pi d_f l_e} \quad \text{equation (1)}$$

wherein $P_b$ is the pull-out load at the fully debonding point, $d_f$ is the fiber diameter, and $l_e$ is the fiber embedding length.

The test procedures can be found in, for example, Lin, X., Yu, J., Li, H., Lam, J. Y., Shih, K., Sham, I. M., & Leung, C. K.; "Recycling polyethylene terephthalate wastes as short fibers in strain-hardening cementitious composites (SHCC)"; Journal of hazardous materials, 2018, 357, 40-52.

Figure 5:
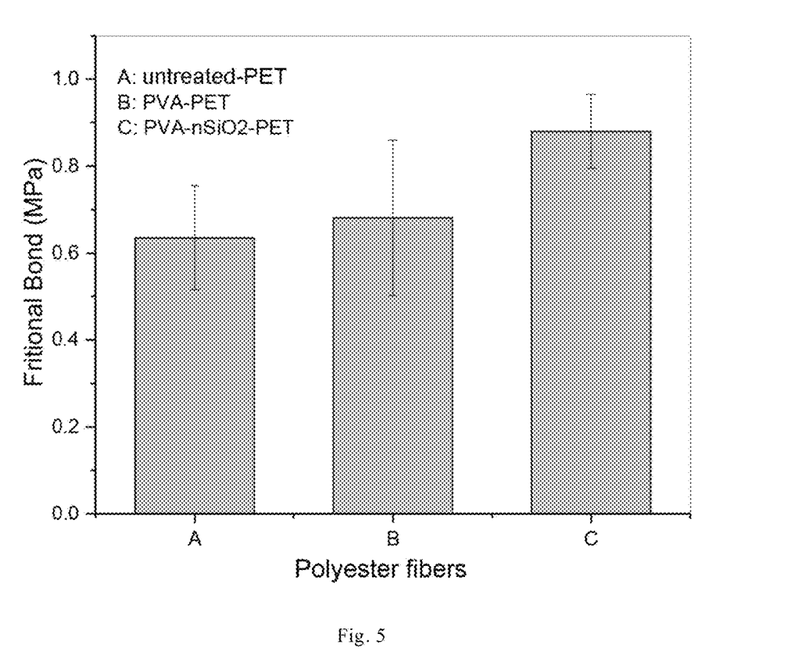
FIG. 5 shows bar charts of frictional bonding analysis of untreated PET fiber, PVA coated PET fiber, and PVA/nano-silica coated PET fiber.

In this test, the above PET fibers were partially embedded in 100% concrete block (as the matrix), and then pulled out by the tensile testing equipment. The pull-out load at the fully debonding point ($P_b$) was obtained from the pull-out force vs displacement curves, and the frictional bond between the fiber and cement matrix was calculated from equation (1). As shown in FIG. 5, the frictional bond measurement A of the untreated PET fibers is 0.635 MPa; the frictional bond measurement B of the PVA coated PET fiber is: 0.681 MPa, and the frictional bond measurement C of the PVA/nano-silica coated PET fiber is 0.88 MPa.

The results indicate that the PVA coated PET fiber has higher frictional bond than the untreated PET fiber, and the PVA/nano-silica coated PET fiber has further enhanced the frictional bond.

Example 3

The untreated PET fibers, the PVA coated PET fibers (obtained from example 1) and the PVA/nano-silica coated PET fibers (obtained from example 2) were each mixed with cement, fly ash, rock fine, additive and water, then cured to obtain ECC samples. ECC composition has a mass ratio of C70FA30RF20W35, in which C means cement, FA means fly ash, RF means rock fine (<2.36 mm), W means water, and the ECC composite contains 2.0 vol. % of PET fibers.

For the mechanical test, ECC composite was prepared into 40 mm cubic specimen and dog-bone specimens for compression test and direct tensile test respectively. The dog-bone specimen had a dimension of 20 mm(H)×60 mm(W)×330 mm(L), and the cross-section of its middle portion was 20 mm(H)×30 mm(W). The cubic specimens were tested under compression and the dog-bone specimens were tested under tension at the age of 28 days. Prior to testing, all the specimens were cured in water at 27±2° C.

Test Example 3: Compressive Strength Test and Tensile Test

Compressive strength test: the loading rate setting for compression test was 0.6 MPa/s, and the test was stopped when the compressive load had reduced to 85% of its maximum.

Tensile test: the specimen was gripped at the transition region between the middle reducing section and the end sections. Tensile force was then applied by a mechanical test machine through the fixtures attached to the two ends of the specimen. The loading rate of the tensile test was 0.3 mm/min. Axial deformation of specimen was measured in the middle part of the specimen with a pair of LVDTs fixed to the specimen. The results of the compressive strength, tensile strength and tensile capacity were summarized in table 1.

TABLE 1

| Sample | ECC-1 | ECC-2 | ECC-3 |
|---|---|---|---|
| Weight ratio | C70FA30RF20W35 | | |
| Fiber (2%, 40 µm, 12 mm) | Untreated PET | PVA-PET | PVA/SiO$_2$-PET |
| Compressive strength (MPa) | 50.40 | 55.20 | 57.00 |
| Ultimate tensile strength (MPa) | 1.97 | 2.40 | 1.70 |
| Tensile capacity (%) | 0.44 | 1.76 | 1.59 |

As compared with ECC-1, ECC-2 and ECC-3 show improved compressive strength and tensile capacity. In particular, the tensile capacities of the ECC-2 and ECC-3 were 1.76% and 1.59% respectively (at least three times than that of ECC-1), suggesting that the surface treated PET fibers of the disclosure have an enhanced interfacial interaction between the fiber and the cement matrix.

Therefore, a robust cross-linked PVA polymeric coating is successfully developed and coated onto the hydrolyzed polyester fiber by simple wet coating procedure of the disclosure. Since the PVA cross-linked network has been formed by heat curing step, the interfacial interaction between the fiber and the cement matrix can be effectively enhanced, and the polyester fibers surface-treated according to the disclosure are useful for further applications (such as ECC). In addition, the addition of a small amount of nanoparticles (such as nano-$SiO_2$, nano-$CaCO_3$ or the like) can result in a nano-composite coating on the surface of the polyester fiber, and the interfacial interaction between the fiber and the cement matrix can be further enhanced due to the surface stability caused with the presence of the nanoparticles.

Although the embodiments of the disclosure have been described by reference to certain examples, other embodiments will be apparent from such description. Accordingly, the inventive concepts are not limited to such embodiments, but rather to the broader scope of the claims and various obvious modifications and equivalent arrangements as would be apparent to a person of ordinary skill in the art.

What is claimed is:

1. A method for preparing a modified polyester fiber, comprising
   subjecting a polyester fiber to an alkali hydrolysis to yield a hydrolyzed polyester fiber;
   applying a solution to the hydrolyzed polyester fiber, wherein the solution contains an acid cross-linker and a polyvinyl alcohol; and
   then curing the hydrolyzed polyester fiber to form a coating, the coating having a thickness of one of a sub-micron or a micron scale, thereby yielding the modified polyester fiber, wherein a weight ratio of the polyvinyl alcohol to the hydrolyzed polyester fiber is in a range of 1:3 through 1:20.

2. The method of claim 1, wherein the solution further contains a nanoparticle.

3. The method of claim 2, wherein a weight ratio of the nanoparticle to the polyvinyl alcohol is in a range of 1:1 through 1:10.

4. The method of claim 1, further comprising:
   subjecting the polyester fiber to a hydrolysis in a 3 to 10 wt % alkali metal hydroxide aqueous solution at a weight ratio in a range of 1:5 through 1:30 for a range of 20 minutes through 40 minutes at a temperature in a range of 75° C. through 90° C.; and
   washing the polyester fiber with water, thereby yielding the hydrolyzed polyester fiber.

5. The method of claim 1, further comprising:
   subjecting the polyester fiber to a hydrolysis in a 5 wt % sodium hydroxide aqueous solution at a weight ratio in a range of 1:25 through 1:28 for 30 minutes at a temperature of 80° C. through 85° C.; and
   washing the polyester fiber with water, thereby yielding the hydrolyzed polyester fiber.

6. The method of claim 1, wherein the polyester fiber is subjected to a hydrolysis in a 5 wt % sodium hydroxide aqueous solution at a weight ratio in a range of 1:25 through 1:28 for 30 minutes a temperature in a range of 80° C. through 85° C.

7. The method of claim 1, wherein the acid cross-linker is one of a di-carboxylic acid cross-linker, a tri-carboxylic acid cross-linker, or a tetra-carboxylic acid cross-linker, and wherein a weight ratio of the polyvinyl alcohol to the acid cross-linker is in range of 10:1 through 30:1.

8. The method of claim 1, wherein the hydrolyzed polyester fiber is mixed in the solution containing the acid cross-linker and the polyvinyl alcohol at a temperature in a range of 25° C. through 60° C. for a range of 10 minutes through 15 minutes.

9. The method of claim 1, wherein the acid cross-linker is citric acid and the weight ratio of the polyvinyl alcohol to the citric acid is 20:1.

10. The method of claim 9, wherein the hydrolyzed polyester fiber is mixed in the solution containing the citric acid and the polyvinyl alcohol at 50° C. for a range of 10 minutes through 15 minutes.

11. The method of claim 1, wherein the curing is conducted for a range of 20 minutes through 40 minutes at a temperature in range of 120° C. through 140° C.

12. The method of claim 1, wherein the polyester fiber having a diameter in a range of 10 μm through 50 μm.

13. The method of claim 1, wherein the coating has a thickness in a range of 100 nm through 500 nm.

14. The method of claim 1, wherein a polyethylene glycol is coated on the surface of the coating of the hydrolyzed polyester fiber.

15. The method of claim 2, wherein the nanoparticle has an average particle size of in a range of 20 nm through 40 nm.

16. The method claim 1, wherein the coating has a thickness in a range of 700 nm through 3.4 μm, and wherein a polyethylene glycol is coated on the surface of the coating of the hydrolyzed polyester fiber.

17. A modified polyester fiber prepared according to the method of claim 1.

18. A cementitious composite prepared from a method comprising:
   subjecting a polyester fiber to an alkali hydrolysis to yield a hydrolyzed polyester fiber;
   applying a solution to the hydrolyzed polyester fiber, wherein the solution contains an acid cross-linker and a polyvinyl alcohol; and
   then curing the hydrolyzed polyester fiber to form a coating, the coating having a thickness of one of a sub-micron or a micron scale, thereby yielding the modified polyester fiber, wherein a weight ratio of the polyvinyl alcohol to the hydrolyzed polyester fiber is in a range of 1:3 through 1:20,
   mixing the modified polyester fiber with a concrete material and
   curing the modified polyester fiber mixed with the concrete material, thereby yielding a cementitious composite, wherein a volume ratio of the modified polyester fiber to the cementitious composite is 2.5% or less.

* * * * *